United States Patent
Hieter et al.

(10) Patent No.: US 10,552,562 B2
(45) Date of Patent: *Feb. 4, 2020

(54) LEVERAGE CYCLE STEALING WITHIN OPTIMIZATION FLOWS

(71) Applicant: INTERNATIONAL BUSINESS MACHINES CORPORATION, Armonk, NY (US)

(72) Inventors: Nathaniel D. Hieter, Clinton Corners, NY (US); Kerim Kalafala, Rhinebeck, NY (US); Alexander J. Suess, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,741

(22) Filed: Nov. 20, 2017

(65) Prior Publication Data

US 2018/0239844 A1    Aug. 23, 2018

Related U.S. Application Data

(63) Continuation of application No. 15/439,991, filed on Feb. 23, 2017, now Pat. No. 10,216,875.

(51) Int. Cl.
*G06F 17/50* (2006.01)

(52) U.S. Cl.
CPC ........ *G06F 17/5031* (2013.01); *G06F 17/505* (2013.01); *G06F 17/5081* (2013.01); *G06F 2217/84* (2013.01)

(58) Field of Classification Search
CPC ............... G06F 17/5031; G06F 17/505; G06F 17/5081; G06F 2217/84
See application file for complete search history.

(56) References Cited

U.S. PATENT DOCUMENTS

| | | |
|---|---|---|
| 4,916,627 A | 4/1990 | Hathaway |
| 6,591,407 B1 | 7/2003 | Kaufman |

(Continued)

OTHER PUBLICATIONS

Borkenhagen et al., "Algorithm for Logic Block Power Level Optimization Based on Timing Slack", An IP.com Prior Art Database Technical Disclosure, Original Publication Date: Nov. 1, 1992, IP.com No. IPCOM000110321D, IP.com Electronic Publication Date: Mar. 25, 2005, 10 pages.

(Continued)

*Primary Examiner* — Naum Levin
(74) *Attorney, Agent, or Firm* — Michael O'Keefe

(57) ABSTRACT

A method, computer program product, and system for calculating an input timing slack at an input to a latch by subtracting an input arrival time to the latch from an input required arrival time, calculating an output timing slack at an output to the latch by subtracting an output arrival time of the latch from an output required arrival time from the latch, performing cycle stealing to improve the output timing slack by modifying the input required arrival time and the output arrival time, reducing the output timing slack by a pessimism amount, performing optimization in the integrated circuit to improve the input timing slack and the output timing slack, and increasing the output timing slack by the pessimism amount.

12 Claims, 8 Drawing Sheets

(56) References Cited

U.S. PATENT DOCUMENTS

| | | | |
|---|---|---|---|
| 6,668,357 B2* | 12/2003 | Masleid | G06F 1/04 326/83 |
| 6,701,498 B2* | 3/2004 | Becker | G06F 17/5031 716/108 |
| 6,922,818 B2* | 7/2005 | Chu | G06F 17/505 716/114 |
| 7,062,734 B2 | 6/2006 | Collins | |
| 7,302,685 B2 | 11/2007 | Binns et al. | |
| 7,401,307 B2 | 7/2008 | Foreman et al. | |
| 7,895,544 B2* | 2/2011 | Amundson | G06F 17/505 716/119 |
| 7,937,604 B2* | 5/2011 | Banerji | G06F 17/505 713/400 |
| 8,321,824 B2* | 11/2012 | Zejda | G06F 17/5031 716/108 |
| 8,407,640 B2* | 3/2013 | Le | G06F 17/5031 703/19 |
| 8,572,532 B1 | 10/2013 | Singh | |
| 8,615,727 B2* | 12/2013 | Ghanta | G06F 17/504 716/134 |
| 9,058,456 B2* | 6/2015 | Haller | G06F 17/5036 |
| 9,436,794 B2 | 9/2016 | Teig et al. | |
| 9,754,062 B2* | 9/2017 | Kalafala | G06F 17/5068 |
| 10,216,875 B2* | 2/2019 | Hieter | G06F 17/5031 |
| 2003/0163792 A1 | 8/2003 | Xie | |
| 2005/0251776 A1 | 11/2005 | Hsin | |
| 2006/0190899 A1 | 8/2006 | Migatz | |
| 2007/0033427 A1* | 2/2007 | Correale, Jr. | G06F 1/10 713/500 |
| 2012/0072880 A1* | 3/2012 | Le | G06F 17/5031 716/113 |
| 2012/0159414 A1 | 6/2012 | Ghanta | |
| 2016/0110492 A1 | 4/2016 | Huang et al. | |
| 2016/0266604 A1 | 9/2016 | Krishnamurthy | |
| 2017/0046464 A1 | 2/2017 | Berry | |
| 2018/0239844 A1 | 8/2018 | Hieter | |
| 2018/0239845 A1 | 8/2018 | Hieter | |

OTHER PUBLICATIONS

Synopsys, Inc., "Design Compiler Technology Backgrounder", Apr. 2006, pp. 1-13.

Kalafala et al., Timing Adjustments Across Transparent Latches to Facilitate Power Reduction, U.S. Appl. No. 14/934,422, filed Nov. 6, 2015, 20 pages.

Goetz et al., "Timing Analysis Using Slack Stealing", An IP.com Prior Art Database Technical Disclosure, Original Publication Date: Mar. 1, 1991, IP.com No. IPCOM000120121D, IP.com Electronic Publication Date: Apr. 2, 2005, 3 pages.

Mell et al., "The NIST Definition of Cloud Computing", National Institute of Standards and Technology, Special Publication 800-145, Recommendations of the National Institute of Standards and Technology, Sep. 2011, 7 pages.

Cadence, "Timing Analysis for Ambit® BuildGates® Synthesis and Cadence® PKS", Product Version 4.0.8, May 2001, <http://www.ee.virginia.edu/~mrs8n/soc/SynthesisTutorials/synta.pdf>, 250 pages.

"Time Borrowing and Time stealing", Ohotspot Blogspot, Sep. 3, 2012, 9 pages, <http://ohotspot.blogspot.com/2012/09/time-borrowing-and-time-stealing.html>.

Hieter et al., "Leverage Cycle Stealing Within Optimization Flows", U.S. Appl. No. 15/439,991, filed Feb. 23, 2017.

List of IBM Patents or Patent Applications Treated as Related. Filed Nov. 20, 2017. 2 pages.

IBM: List of IBM Patents or Patent Applications Treated as Related (Appendix P), Mar. 20, 2018, pp. 1-2.

IBM: List of IBM Patents or Patent Applications Treated as Related (Appendix P), Jun. 5, 2019, pp. 1-2.

\* cited by examiner

LEVERAGE CYCLE STEALING WITHIN OPTIMIZATION FLOWS

BACKGROUND

The present invention relates generally to a method, system, and computer program product for electronic design automation, and more particularly to a method, system, and computer program product for slack stealing improvement.

Electronic design automation (EDA) is used to design integrated circuits. Integrated circuit or chip designers use EDA for analysis and design optimization of a semiconductor chip design. Analysis of the semiconductor chip design includes timing analysis, which can provide measurements of slack times of transparent latches in the semiconductor chip design. Design slack improvement can be performed by slack stealing, cycle stealing, or cycle steal adjusts, which will move available slack from either an input or output side of a latch or electrical component to another output or input of the component, by design adjustments to modify a clock launch and/or a data line arrival time.

Slack time can be defined as an amount of time a task can be delayed without causing another task to be delayed or impacting the completion time of an electrical circuit design. Slack time, or slack, is a difference between a desired time or required time for a timing path and an achieved time or arrival time for the timing path. When an input to a latch arrives later than desired, this results in a negative input slack, or the desired time is before the achieved time. A negative slack means that a data signal is unable to traverse Boolean or combinational logic between a start point and an endpoint of a timing path fast enough to ensure an electrical circuit functions as designed. Alternatively, when an input to the latch arrives sooner than desired, this results in a positive input slack, or the achieved time is before the desired time. An arrival time is the latest or earliest time at which an electrical signal output from the latch may switch at a given location within the design. When an input or output on a latch is available later than desired, this results in a negative input/output slack, and when the input/output on the latch is available sooner than desired, this results in a positive input/output slack.

SUMMARY

Embodiments of the present invention disclose a method, a computer program product, and a computer system for calculating an input timing slack at an input to a latch by subtracting an input arrival time to the latch from an input required arrival time, calculating an output timing slack at an output to the latch by subtracting an output arrival time of the latch from an output required arrival time from the latch, performing cycle stealing to improve the output timing slack by modifying the input required arrival time and the output arrival time, reducing the output timing slack by a pessimism amount, performing optimization in the integrated circuit to improve the input timing slack and the output timing slack, and increasing the output timing slack by the pessimism amount.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
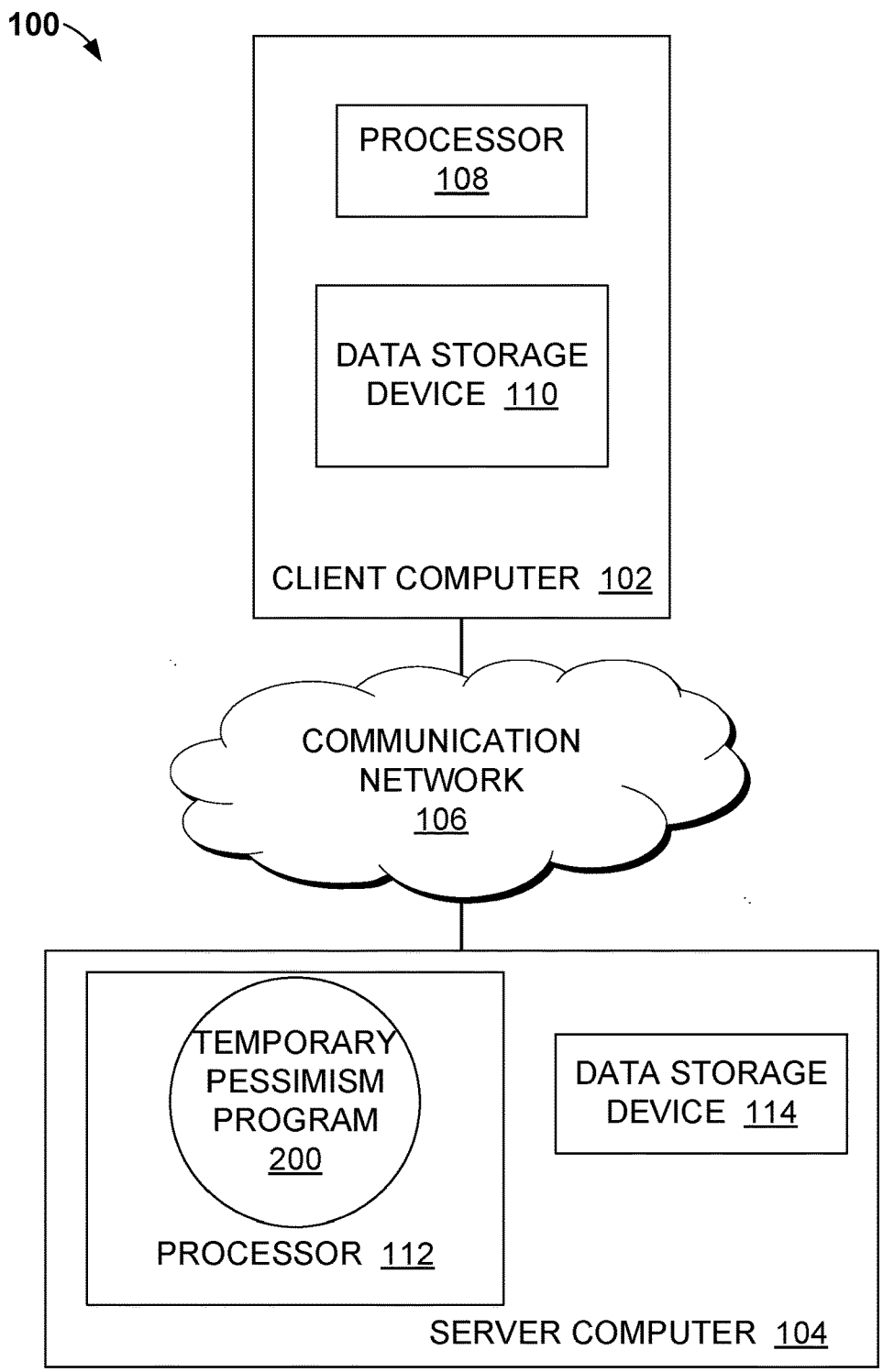
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances, may have not been described in detail. In other instances, some processing steps or operations that are known in the art may not be described at all. It should be understood that the following description is rather focused on the distinctive features or elements of various embodiments of the present invention.

As previously described, electronic design automation (EDA) is used to design integrated circuits. Integrated circuit or chip designers use this software for analysis and design optimization of a semiconductor chip design. Analysis of the semiconductor chip design includes timing analysis, which can provide measurements of slack times of electronic components or transparent latches in the semiconductor chip design. Improvement of timing cycles can be performed by slack stealing or cycle stealing, which will move available slack from either an input or an output side of a latch to another side (output or input) of the latch, by adjusting a clock launch and data or test edge arrival side. A microprocessor electronic design of integrated circuits may have thousands of latches or transistors or electronic components.

The present invention generally relates to electronic design automation of integrated circuits. One way to improve electronic design automation is to leverage slack or cycle stealing by selectively adding temporary pessimism to select transparent latches, or latches. An embodiment by which to add temporary pessimism to select latches is described in detail below by referring to the accompanying drawings in FIGS. 1 to 6. Those skilled in the art will readily appreciate that the detailed description given herein with respect to these figures is for explanatory purposes as the invention extends beyond these limited embodiments.

Slack is considered 'optimizable' if there is improvement available in the design above the current slack. Traditionally, cycle stealing algorithms may measure slack, and perform timing adjustments based on the available slack on the inputs or outputs of latches. The amount of available slack is limited to the slack measurements and any positive slack measurements, either at an input or at an output of a latch. An optimization tool may make design adjustments until the target or desired or goal slack is achieved and/or available slack has been recovered to save power. A goal slack may be an output slack of zero, or a balanced input slack and output slack.

The input slack, $T_{si}$, and the output slack, $T_{so}$, may be calculated from a deterministic (single corner) static timing analysis, may be projected values obtained from a statistical timing run, may be canonical slacks from a statistical static timing analysis, may be from sampling multiple deterministic static timing analysis, or may be obtained as a combination of slack values from multiple such analyses.

Referring now to FIG. 1, a functional block diagram illustrating a system 100 in a networked computer environment, in accordance with an embodiment of the present invention, is shown. The system 100 may include a client computer 102 and a server computer 104. The client computer 102 may communicate with the server computer 104 via a communications network 106 (hereinafter "network"). The client computer 102 may include a processor 108, a data storage device 110, and is enabled to interface with a user and communicate with the server computer 104. The server computer 104 may also include a processor 112 and a data storage device 114 that is enabled to run a temporary pessimism program 200. In an embodiment, the client computer 102 may operate as an input device including a user interface while the temporary pessimism program 200 may run primarily on the server computer 104. In an alternative embodiment, the temporary pessimism program 200 may run primarily on the client computer 102 while the server computer 104 may be used for processing a storage of data used by the temporary pessimism program 200.

It should be noted, however, that processing for the temporary pessimism program 200 may, in some instances be shared amongst the client computer 102 and the server computer 104 in any ratio. In another embodiment, the temporary pessimism program 200 may operate on more than one server computer 104, client computer 102, or some combination of server computers 104 and client computers 102, for example, a plurality of client computers 102 communicating across the network 106 with a single server computer 104.

The network 106 may include wired connections, wireless connections, fiber optic connections, or some combination thereof. In general, the network 106 can be any combination of connections and protocols that will support communications between the client computer 102 and the server computer 104. The network 106 may include various types of networks, such as a local area network (LAN), a wide area network (WAN) such as the Internet, a telecommunication network, a wireless network, a public switched network and/or a satellite network.

In various embodiments, the client computer 102 and/or the server computer 104 may be, for example, a laptop computer, tablet computer, netbook computer, personal computer (PC), a desktop computer, a personal digital assistant (PDA), a smart phone, a mobile device, or any programmable electronic device capable of communicating with the server computer 104 via the network 106. As described below with reference to FIG. 4, the client computer 102 and the server computer 104 may each include internal and external components. In other embodiments, the server computer 104 may be implemented in a cloud computing environment, for example, cloud computing nodes 510, as described in relation to FIGS. 5 and 6 below. Similarly, the client computer 102 may be implemented in the cloud computing environment, for example, laptop computer 540C as shown in FIG. 5.

In an embodiment, the system 100 may include any number of client computers 102 and/or server computers 104; however only one of each is shown for illustrative purposes only. It may be appreciated that FIG. 1 provides only an illustration of an implementation and does not imply any limitations with regard to the environments in which different embodiments may be implemented. Many modifications to the depicted environments may be made based on design and implementation requirements.

The system 100 may be generally configured to perform actions to leverage slack or cycle stealing by selectively adding temporary pessimism to select latches of a circuit design. In this invention, the addition of temporary pessimism creates incentives which allow optimization to work beyond the goal slack such that more slack is available for an additional round of slack stealing, resulting in an improved overall design.

The temporary pessimism program 200, and associated methods are described and explained in further detail below with reference to FIGS. 2-6.

Figure 2:
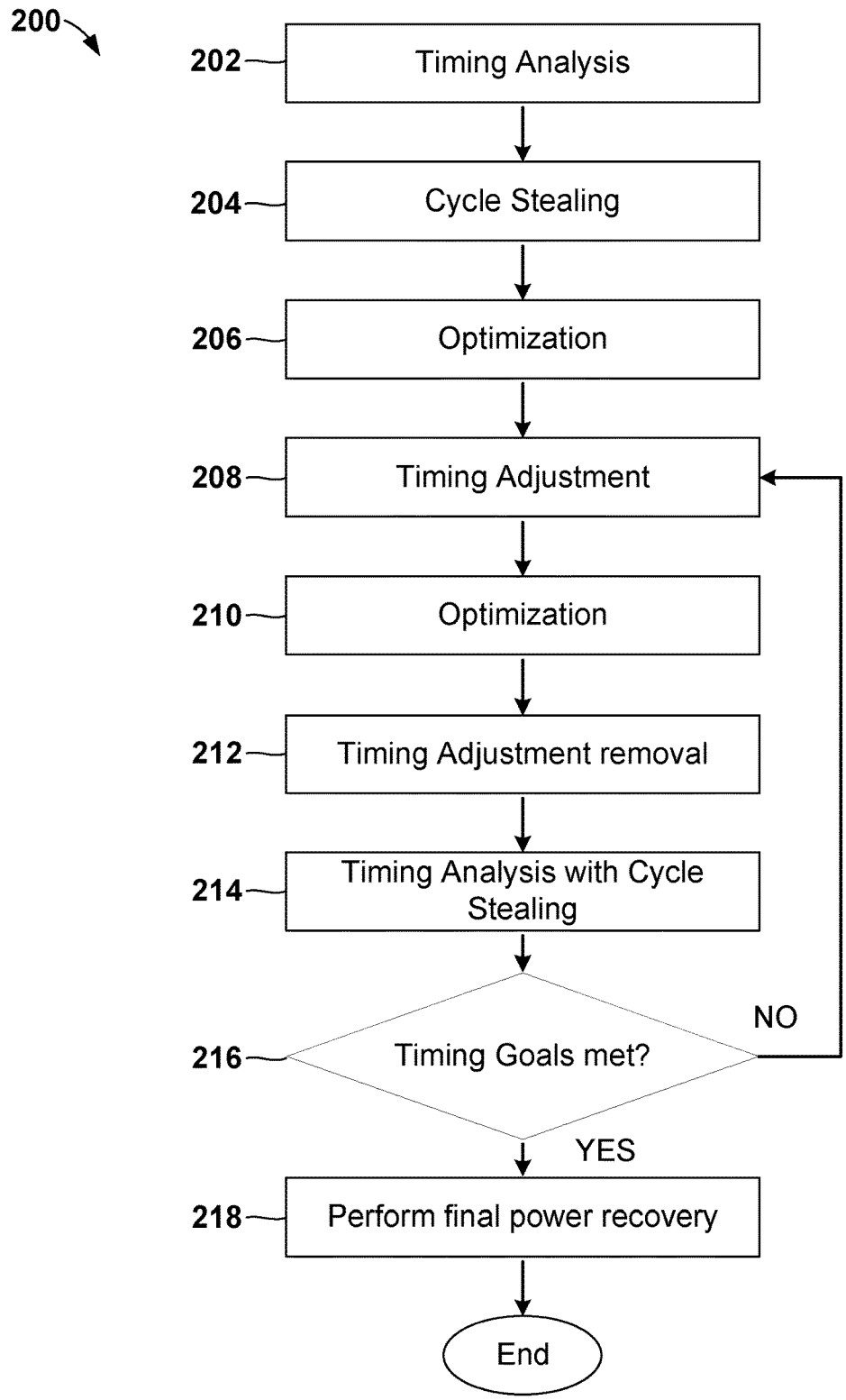
FIG. 2 is a block diagram depicting leverage cycle stealing within optimization flows, in accordance with an embodiment of the present invention.

Referring now to FIG. 2 and with continued reference to FIG. 1, a simplified flow diagram of a temporary pessimism program 200 within optimization flows is provided, in accordance with an embodiment of the present invention. The temporary pessimism program 200 may be configured to leverage slack or cycle stealing by selectively adding temporary pessimism to select latches of a circuit design. In an embodiment of the present invention, timing adjustments (or temporary pessimism) are selectively inserted in order to encourage optimization. Optimization with temporary pessimism may provide additional slack improvement at an output of select latches.

Timing analysis of an electronic circuit may be performed at step 202 of the temporary pessimism program 200. This timing analysis may calculate input slack and output slack of each electronic device or latch in the electronic circuit.

Referring now to FIGS. 3A-3F, and with continued reference to FIGS. 1 and 2, FIGS. 3A-3F each have a timing diagram including a clock signal, an input signal, an output required time signal, and an output arrival time signal, in accordance with an embodiment of the present invention. In an embodiment, the clock signal and the input signal may be inputs to a first latch, while the output required time represents a required arrival time of an output of the first latch. The required arrival time, or input required arrival time, of the first latch is determined by the clock transition time as well as a corresponding setup time, as is shown as clock signal time in the following tables. The input as shown in the embodiment may be referred to as the input arrival time. This example demonstrates a late mode arrival time at the data input. The output of the first latch is input downstream to one or more additional latches in the circuit, and the output required time is the worst required time from all downstream latches (as determined by timing analysis). The output arrival time is the timing of the output of the first latch before feeding the downstream one or more additional latches in the circuit.

Figure 3A:
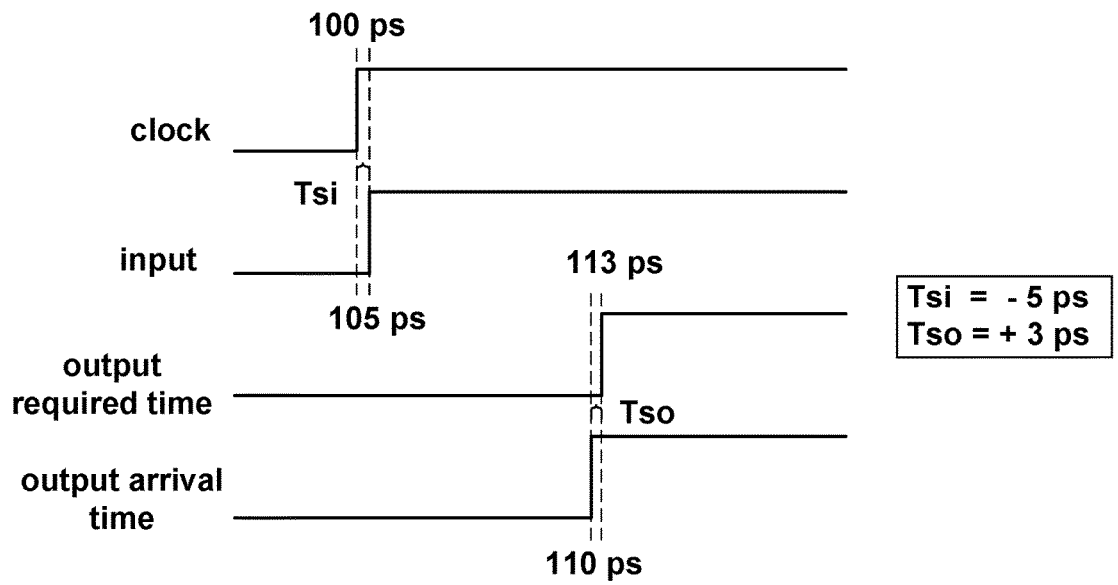
FIGS. 3A, 3B, 3C, 3D, 3E, and 3F, are each a timing diagram, in accordance with an embodiment of the present invention.

An example of a timing analysis performed in step 202 of FIG. 2 is shown in FIG. 3A.

In the example of FIG. 3A, a late mode arrival time is considered for data input to a latch, and an early mode arrival time is used for the output arrival time. In general, timing tests may include several combinations of early mode arrival time, late mode arrival time, early mode of the output arrival time and late mode of the output arrival time. Input timing slack or input slack represents how the late mode input or data signal on a latch is arriving relative to an early mode clock. For transparent latches, data may transition from data input to output at any time during the active interval of the clock (e.g., in the period of time between the clock rising and failing, for positive active latches, and vice versa for negative active latches). However, to avoid loops in the timing graph, it is often advantageous in the process of static timing analysis to select a cycle time boundary at some chosen time within the active clock interval. A loop in a timing graph is a path which feeds back to itself and should be avoided because acyclic static timing analysis would be unable to calculate signal arrival times. A cycle boundary is a chosen time during the active interval of the clock by which data or input is required to arrive, and is also used as a basis to compute a late mode output arrival time.

When an input data arrival time occurs at a latch after a chosen cycle boundary, or clock edge, a setup test failure (i.e., negative slack) will be reported. When an input data arrival time is before the cycle boundary, the slack at the input of the latch is positive. Output timing slack represents a worst slack for all paths feeding other end points (e.g., latches, or other timing nodes for which a constraint has been defined) downstream from a latch, based upon the output arrival time resulting from the chosen cycle boundary. By modeling the latch with a specific cycle boundary time, static timing analysis is simplified in that the timing propagation from data input to output can be removed and replaced with a propagation time from clock to data output, occurring in conjunction with the chosen cycle boundary. This particular modeling approach reduces the likelihood of problematic loops in the timing graph which would otherwise tend to occur when modeling the propagation of data from latch input to output.

In FIG. 3A, the clock signal changes from a low signal to a high signal at the time 100 picoseconds (ps). In this example, the desired time for the input signal is at 100 ps, which is the time the clock signal changes from a low signal to a high signal. The input signal changes from a low signal to a high signal at 105 ps. The resulting $T_{si}$, input slack, is −5 ps, or 100 ps minus 105 ps, resulting in $T_{si}$=−5 ps, which is the clock signal change time minus the input signal change time. For exemplary purposes, latch setup time has been assumed to be zero in the present example, however those skilled in the art will readily recognize that the slack at a latch input is dependent on latch setup time as well. Furthermore, in this example, distinctions between late and early arrival times are omitted, however those skilled in the art will readily recognize that timing values can be computed in either early or late mode, and that slacks are generally computed by comparing a late mode data arrival time against an early mode clock, or vice versa. Also in this example, the output required time of the latch output, is computed to be 113 ps. The output arrival time of the latch output is available at 110 ps, demonstrated as a change from a low signal to a high signal at 110 ps. The output arrival time is before the output required time. The resulting $T_{so}$ output slack, is 3 ps, or 113 ps minus 110 ps, resulting in $T_{so}$=3 ps, which is the output required time minus the output arrival time. A summary of the example slack timings of FIG. 3A is shown below in Table 1, which also corresponds to an initial timing analysis, as performed in step 202 of the temporary pessimism program 200.

TABLE 1

| Clock | Input | $T_{si}$ | Output required time | Output arrival time | $T_{so}$ |
|---|---|---|---|---|---|
| 100 ps | 105 ps | −5 ps | 113 ps | 110 ps | 3 ps |

Referring back to FIG. 2, cycle stealing may be performed at step 204. Cycle stealing or slack stealing may move available slack from either an input or output side of a latch or component to another output or input of the component, by design adjustments to modify a clock launch and/or a data line arrival time. The purpose of cycle stealing is to determine an optimal or improved cycle boundary in the active interval of the clock period (e.g., between a rising clock edge and a falling clock edge, further adjusted by setup constraints), which ideally will reach a goal slack on both input and output. Input slack and output slack may not completely be balanced by cycle stealing. Setup constraints are the extra time needed for a latch to capture the data input.

Figure 3B:
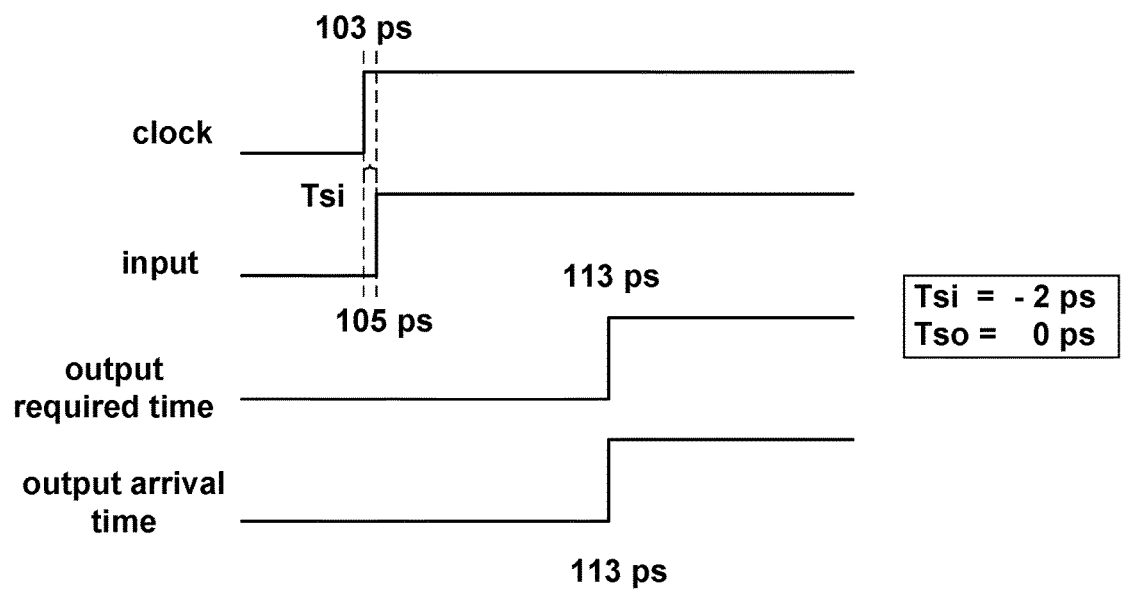

FIG. 3B demonstrates a resulting timing diagram of the clock signal, the input signal, the output required time signal, and the output arrival time signal, after slack stealing. For example, there may be constraints applied to the cycle stealing algorithm to prevent the slack at the output of the latch from going negative as a result of a cycle stealing adjustment. In this example, after cycle stealing, the clock cycle boundary has been adjusted by 3 ps to a time of 103 ps, while the input signal changes from low to high at a time of 105 ps. The required arrival time for the input now is 103 ps. The input slack, $T_{si}$ is −2 ps, which is 103 ps minus 105 ps. This is an improvement of the input slack. Previously the input slack was −5 ps, or the input signal was available 5 ps after the cycle boundary which was originally assumed to be coincident with the rising transition of the clock signal. Due to slack stealing, now the input slack is −2 ps, or the input signal is available 2 ps after the cycle boundary of the clock signal, which has been adjusted by 3 ps. Slack stealing is also used to adjust the latch output arrival time by the same amount (3 ps) and the latch output arrival time becomes 113 ps, which matches the required time for the output signal. The output changes from a low signal to a high signal at 113 ps, and the output slack $T_{si}$=0 ps. Note that in this example, it is assumed that cycle stealing is constrained so as to prevent the introduction of a negative slack at the latch output. A summary of updated slack timings of FIG. 3B after slack stealing is shown below in Table 2.

TABLE 2

| Clock | Input | $T_{si}$ | Output required time | Output arrival time | $T_{so}$ |
|---|---|---|---|---|---|
| 103 ps | 105 ps | −2 ps | 113 ps | 113 ps | 0 ps |

Referring back to FIG. 2, optimization may be performed at step 206. An optimization tool may calculate input slack and output slack measurements, make design changes to increase and decrease slack across each electronic device in the electronic circuit, and recalculate input slack and output slack after the design changes. This cycle may be repeated until design criteria is met or no further improvement is found. Design criteria may include a slack goal of an output slack of 0, with any remaining slack on the input slack, or a balanced input slack and output slack.

In an example, a positive $T_{so}$ can be reduced until it is 0, and the design adjustments made to a negative $T_{si}$, to improve the $T_{si}$ from a negative number to a less negative number, or to 0. Alternatively, design modifications may be made until $T_{si}$ and $T_{so}$ are equal, or balanced. The slack goals may be dynamically set. The optimization tool may be run by EDA software, or physical modeling synthesis. The optimization tool may also take into account total power consumption of the electronic circuit compared to targeted power consumption and how any design changes may affect power consumption, and also the performance benefit of improved timings vs. power consumption modifications.

Design alterations to improve or increase slack may include increasing a physical size of a logic device (for example an AND gate, an OR gate, a NOT gate, etc.) to make it larger, using a thicker wire, functional swaps of design equivalents to make a design run faster, pin swapping and movement of electronic components closer physically in the circuit. Generally, an increase in circuit area, or an increase in power consumption or resources may be used to improve slack, for example a larger logic gate, and the transistors used to make the logic gate, will consume more power or voltage, and use more physical space. The optimization tool may be used to modify the semiconductor chip design, recalculate the slack, and repeat design changes and slack measurements, until the slack reaches a goal, for example, a slack of 0. Typically, the optimization tool will stop working on a negative slack gate when it reaches the goal slack because pushing the slack above the goal may use additional resources such as power and area.

Alternatively, design alterations to use available positive slack (and reduce power) include decreasing a physical size of a logic gate to make it smaller, using thinner wire, functional swaps of design equivalents to allow a portion of the design to run slower, pin swapping, and movement of electronic components further apart physically in the circuit design. These design alterations may be used to leverage other design improvements which may improve slack in other areas of the electrical component or device. A decrease in slack may correspond to power savings in the circuit or a reduction in power usage, or decrease physical space of the circuit, and often will leave many latch output slacks near a slack goal.

Referring back to the example shown in FIG. 3B and in Table 2 above, the optimization step of step 206 of FIG. 2 would not do any further changes in the physical design of this example, because $T_{so}$ is 0 ps, which is be the design goal for this example, and no further design improvements will be made. Thus, without this invention the input design slack would remain failing at $T_{si}$=−2 ps.

Timing adjustment may be performed at step 208 of FIG. 2. Timing adjustment includes adding temporary pessimism, or negative slack, to select latches in the circuit, making output slack timings appear worse. The latches selected may be those which after an initial round of cycle stealing, one or more of the following conditions exist: an input slack remains negative or below a specified target value; input and output slacks are not balanced; or a cycle boundary time (or clock time) chosen by the cycle stealing algorithm is before an end of an active interval of the clock. As a result of the timing adjustment, the optimization tool will then see a failing slack path on the output of latches which it will attempt to improve by design changes, such as changing a wire length or a wire thickness in a semiconductor chip design.

Note that in the above example of Table 2 or FIG. 3B, the first two conditions have been met, specifically: an input slack remains negative and the input and output slacks are not balanced. Furthermore, for an active clock interval ending at time 110 ps, then the third condition is met.

Temporary pessimism provides more available slack by forcing an output slack measurement to be a lower value number, either a smaller positive number, 0, or a more negative number, making the output slack measurements appear to be failing by having a lower slack value and thus induce the optimization tool to make design changes to improve the slack until it reaches the goal slack.

A determination of the amount of temporary pessimism to be added to an output of a latch may be done in multiple ways. In general, this pessimism will drive optimization to use additional physical area in the circuit, and using alternate components which may increase power usage, in order to improve the slack. Thus, it is desirable to avoid adding pessimism that will not be used via slack stealing to improve the slack on the input of the latch. To avoid unnecessary optimization, the maximum pessimism added may be an amount of failing slack on the latch input. Furthermore, the amount of additional available cycle stealing (i.e., the difference between the trailing edge of the clock and the current cycle boundary) can be used as an upper bound on the amount of temporary pessimism to apply on the output of a latch. This could be further refined by attempting to assess how much slack improvement is possible in a downstream circuit from the latch. A quick analysis of a worst downstream timing path could estimate how much slack could be improved by using delay estimates. The delay estimates may use an existing electronic circuit path transition time (time to switch from high to low or low to high) and output capacitance, and determine the best delay improvement found by using electronic components with a lower voltage threshold or larger, stronger transistors. Output capacitance is the ability of a design circuit to store electrical charge. A sum of delay improvements across all gates in a path could also be used to limit the maximum pessimism added. A prior iteration of optimization may store a maximum slack achievable on a particular latch, and may be used as a possible maximum slack improvement. A score calculation comprising a summation of a score with weights for different criteria may be used to calculate a possible maximum slack improvement, and any pessimism added should not exceed the possible maximum slack improvement.

In another example, the temporary pessimism may be universally applied to an entire electronic circuit, or design. Power usage criteria for the electronic design may also be taken into account, upon comparison with a power usage target.

Figure 3C:
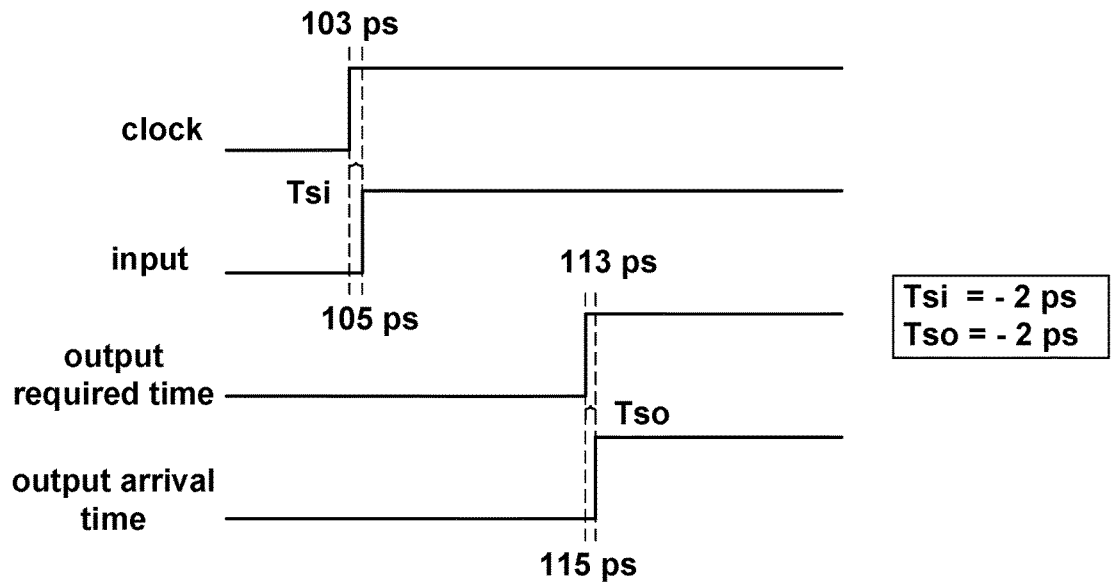

Continuing with the example above of FIG. 3B and Table 2, and applying temporary pessimism to the latch, per the timing adjustment step 308 of FIG. 2, resulting timings may be shown in FIG. 3C and summarized in Table 3 below. In this example, the output slack, $T_{so}$, has been adjusted. The other timings remain the same as in FIG. 3B. Note that in comparison to Table 2, the output arrival time has been modified by 2 ps. The output arrival time has been changed from 113 ps to 115 ps, resulting in $T_{so}$ of −2 ps. The output required time adjustment may be achieved as a result of modifying a delay value, modifying a timing adjustment, or modifying an output required time directly for a point in a downstream electrical signal fan-out cone from the latch.

TABLE 3

| Clock | Input | $T_{si}$ | Output required time | Output arrival time | $T_{so}$ |
|---|---|---|---|---|---|
| 103 ps | 105 ps | −2 ps | 113 ps | 115 ps | −2 ps |

Optimization may be performed at step 210 of FIG. 2. As described above, an optimization tool may calculate input slack and output slack measurements, make design changes to increase and decrease slack across each electronic device in the electronic circuit, and recalculate input slack and output slack after the design changes. Referring back to the example shown in FIG. 3B and in Table 2 shown above, the optimization step 206 of FIG. 2 did not perform any further changes in the physical design of this example, because $T_{so}$ was 0. However, temporary pessimism has now been applied at step 208 of FIG. 2, and as shown in FIG. 3C and in Table 3 above, the $T_{so}$ is now −2 ps. Therefore, optimization may be performed to further improve the slack timings in our example.

Figure 3D:
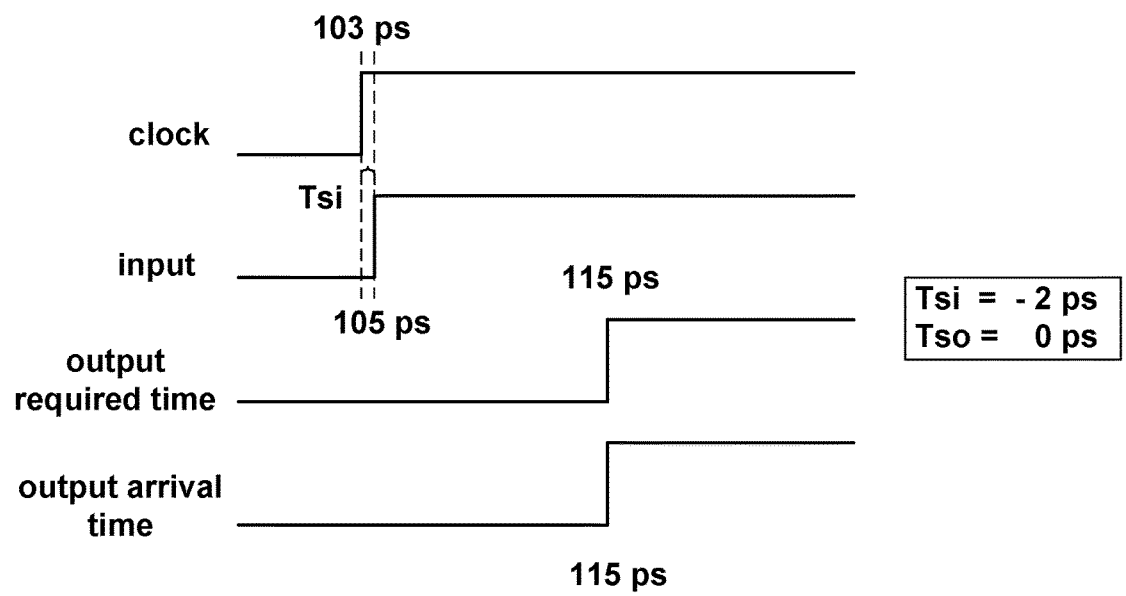

Continuing the example, after the optimization of step 210 of FIG. 2, updated slack timings are shown in FIG. 3D and Table 4 below. Design modifications have resulted in an improved output required time changing from 113 ps to 115 ps, while the output arrival time remains at 115 ps. This modification has resulted in $T_{so}$ improving from −2 ps to 0 ps. The addition of the temporary pessimism of step 208 has allowed the optimization tool to continue with design improvements resulting in this improvement. The clock cycle boundary remains at 103 ps, the input boundary remains at 105 ps, with the $T_{si}$ remaining at −2 ps.

TABLE 4

| Clock | Input | $T_{si}$ | Output required time | Output arrival time | $T_{so}$ |
|---|---|---|---|---|---|
| 103 ps | 105 ps | −2 ps | 115 ps | 115 ps | 0 ps |

Figure 3E:
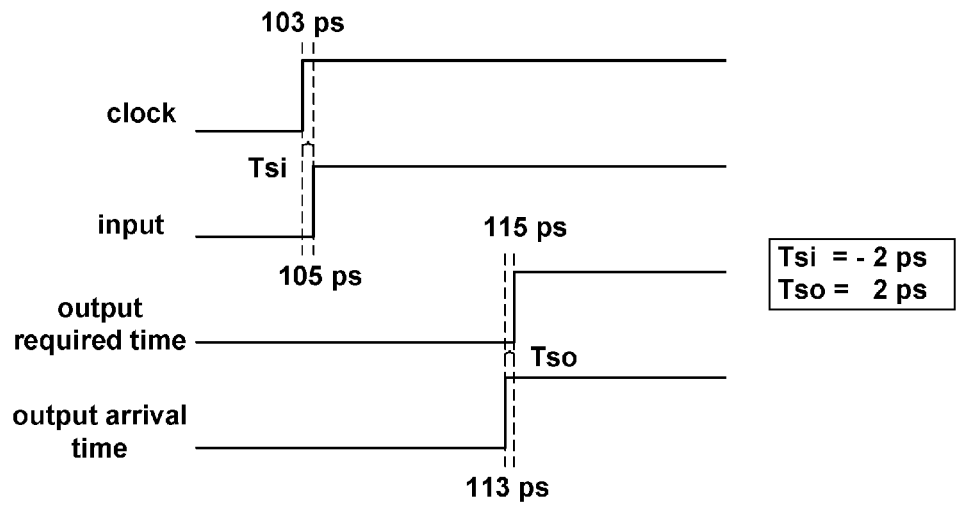

Timing adjustment removal may be done at step 212 of FIG. 2. This step will remove the temporary pessimism which was added at step 208. Continuing the example, −2 ps was added to $T_{so}$ at step 208. In step 212, 2 ps is added back to $T_{so}$, resulting in a new value of $T_{so}$ of 2 ps, which is a positive value, indicating the output arrival time is before the output required time. Updated slack timings are shown in FIG. 3E and Table 5 below.

TABLE 5

| Clock | Input | $T_{si}$ | Output required time | Output arrival time | $T_{so}$ |
|---|---|---|---|---|---|
| 103 ps | 105 ps | −2 ps | 115 ps | 113 ps | 2 ps |

Figure 3F:
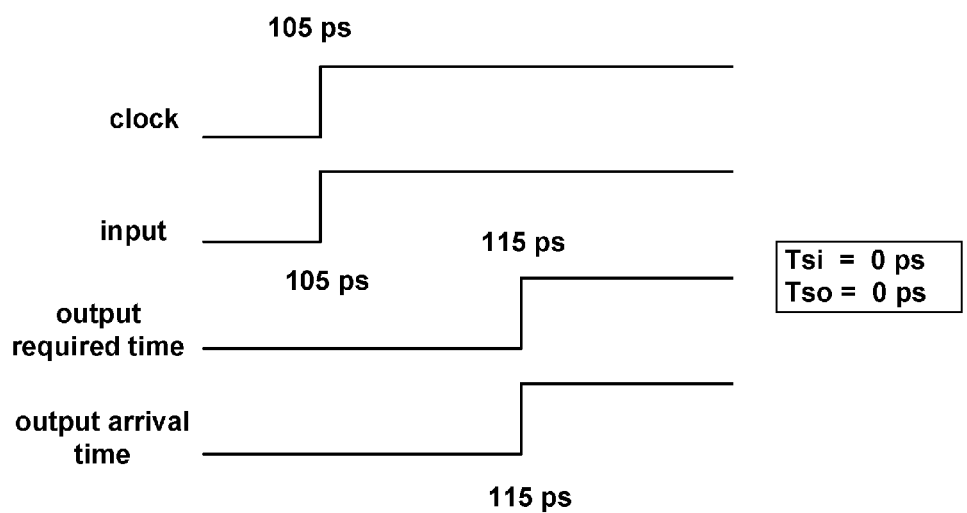

Timing analysis with cycle stealing may be done at step 214 of FIG. 2. This is similar to steps 202 and 204 as described above. Any slack created on outputs during optimization can now be used by cycle stealing on failing inputs. In the example, the 2 ps of available slack on the output, $T_{so}$, is available for the input slack, $T_{si}$, which is failing by 2 ps. Cycle stealing allows the clock cycle boundary to move from 103 ps to 105 ps, while the input remains at 105 ps. This results in $T_{si}$ to be 0 ps. Cycle stealing has moved the output arrival time from 113 ps to 115 ps, while the output required time remains at 115 ps, resulting in $T_{so}$ to be 0 ps. The overall slack for the input slack, $T_{si}$, and the output slack, $T_{so}$, in this example is now 0 ps instead of the previous best of −2 ps. The pessimism program 200 has resulted in our circuit design now reaching the goal of $T_{si}=0$ ps and $T_{so}=0$ ps. Updated slack timings are shown in FIG. 3F and Table 6 below.

TABLE 6

| Clock | Input | $T_{si}$ | Output required time | Output arrival time | $T_{so}$ |
|---|---|---|---|---|---|
| 105 ps | 105 ps | 0 ps | 115 ps | 115 ps | 0 ps |

Checking that slack timing goals of the circuit design can be done at step 216 of FIG. 2. If the slack timing goals have not been met, the pessimism program 200 can continue to the timing adjustment step 208 of FIG. 2. The pessimism program 200 may be repeated sequentially for additional latches in the electronic circuit design, or the pessimism program 200 may be used for several latches at once. If the slack timing goals have been met, the pessimism program 200 can continue to step 218.

Final power recovery may be performed at step 218. Final power recovery may include removal of unnecessary slack created via the targeted pessimism which remains above the slack goal. The excess slack may be consuming excess power, for example, if the input side of a latch had already achieved the slack goal and now is more positive or is now at an increased positive slack. The excess slack can be reduced during power recovery operations, to reduce power usage of the circuit. For example, as described above, using a smaller size gate or a higher voltage threshold for a component of the design or circuit may reduce power usage of the circuit and may reduce excess slack.

Cycle stealing using optimization with pessimism allows for further refinement of the circuit design, and improved overall slack, including both input slack and output slack of the electronic components or latches in the circuit design. This allows for timing of the electronic devices in the circuit design to be closer to desired timings or frequency for the circuit design. The circuit design may be a semiconductor chip.

Figure 4:
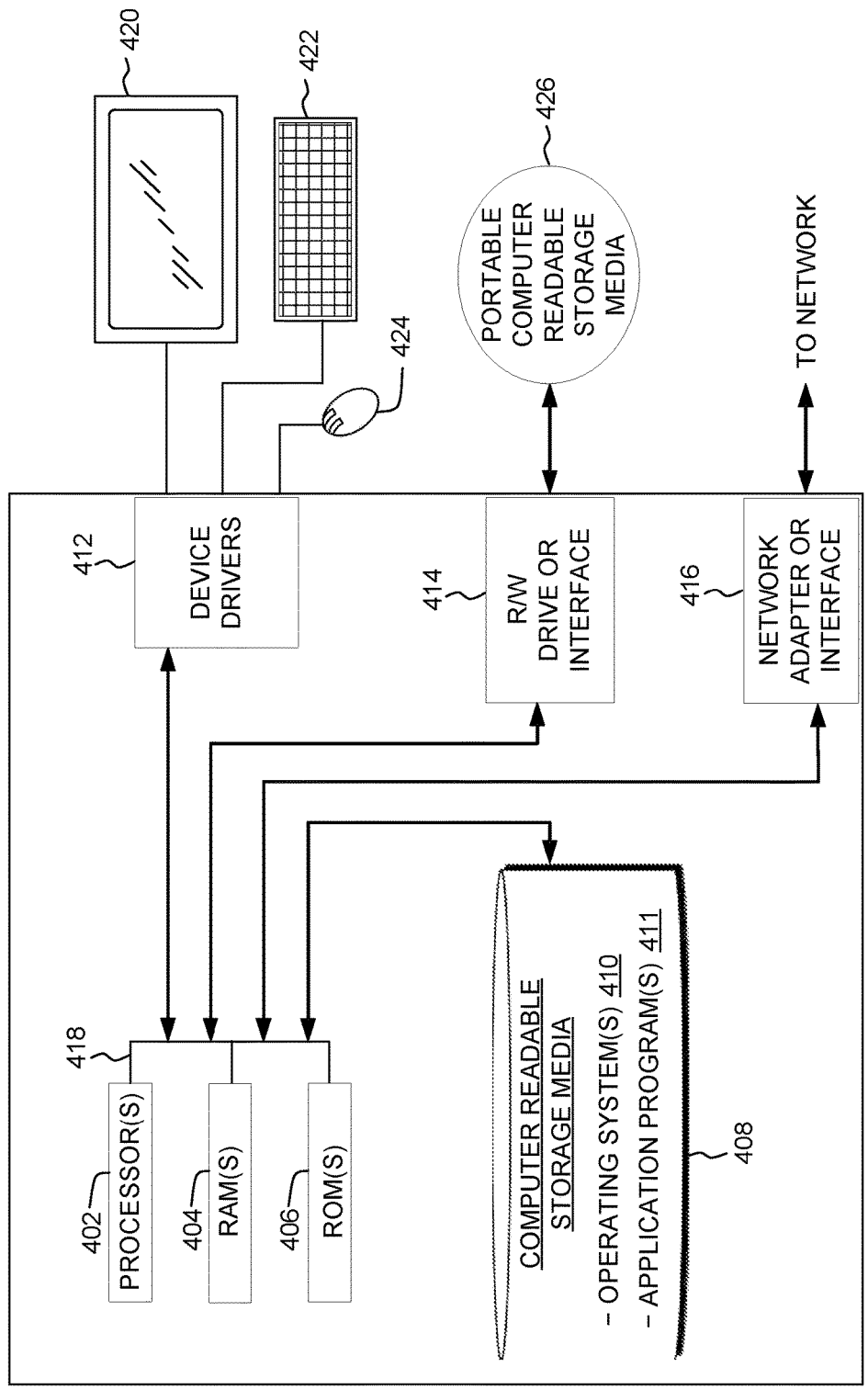
FIG. 4 is a block diagram of internal and external components of computers and servers depicted in FIG. 1, in accordance with an embodiment of the present invention.
Figure 5:
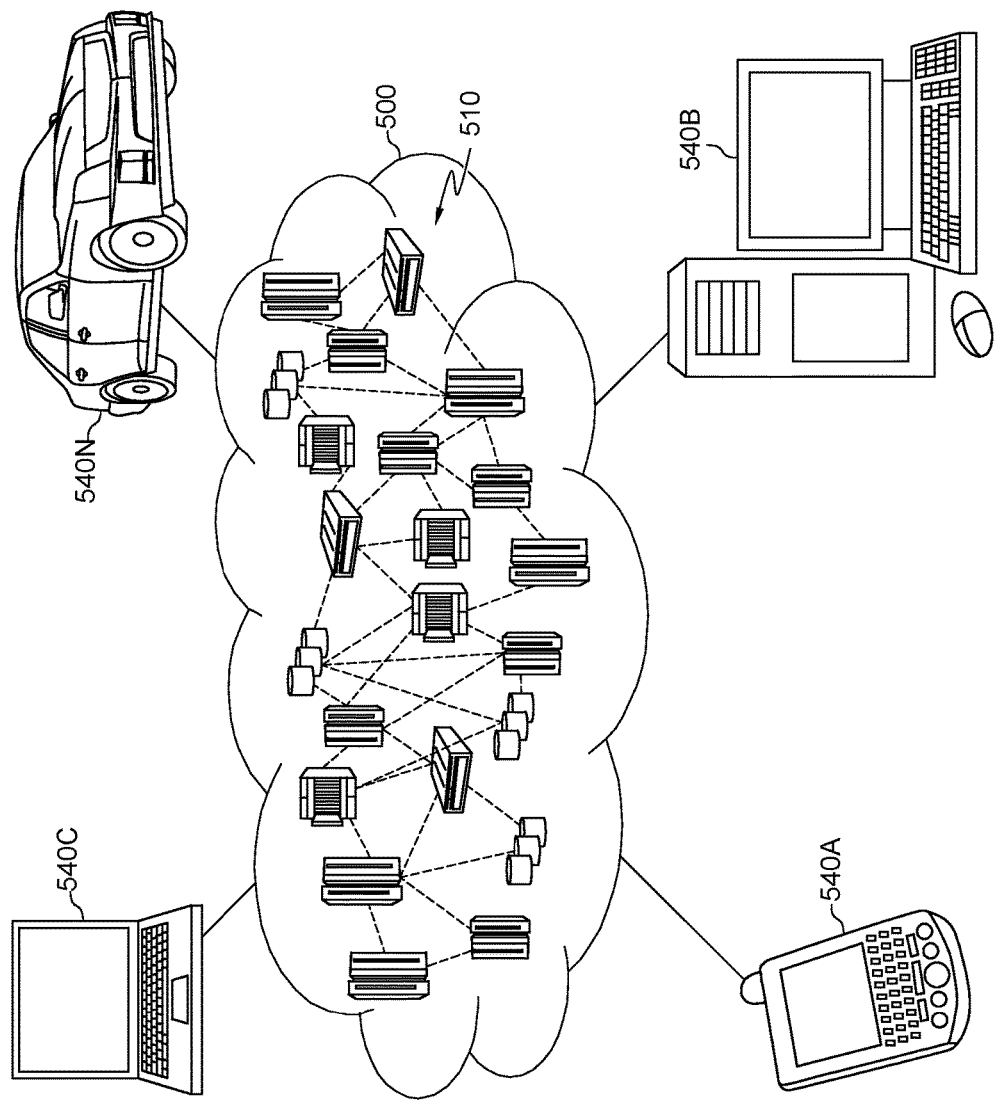
FIG. 5 is a block diagram of functional layers of an illustrative cloud computing environment, including the distributed data processing environment depicted in FIG. 1, in accordance with an embodiment of the present invention.

Referring now to FIG. 4, a block diagram of components of a computing device, such as the client computer 102 or the server computer 104, of the system 100 of FIG. 1, in accordance with an embodiment of the present invention is shown. It should be appreciated that FIG. 4 provides only an illustration of an implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the temporary pessimism program 200, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include the R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include the network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of cloud computing include on-demand self-service, broad network access, resource pooling, rapid elasticity, and measured service, which are each described below.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models include Software as a Service, Platform as a Service, and Infrastructure as a Service, which are each described below.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models include private cloud, community cloud, public cloud, and hybrid cloud, which are each described below.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that cloud computing nodes 510 and cloud computing environment 500 can communicate with any type of computerized device over any type of network and/or network addressable connection (e.g., using a web browser).

Figure 6:
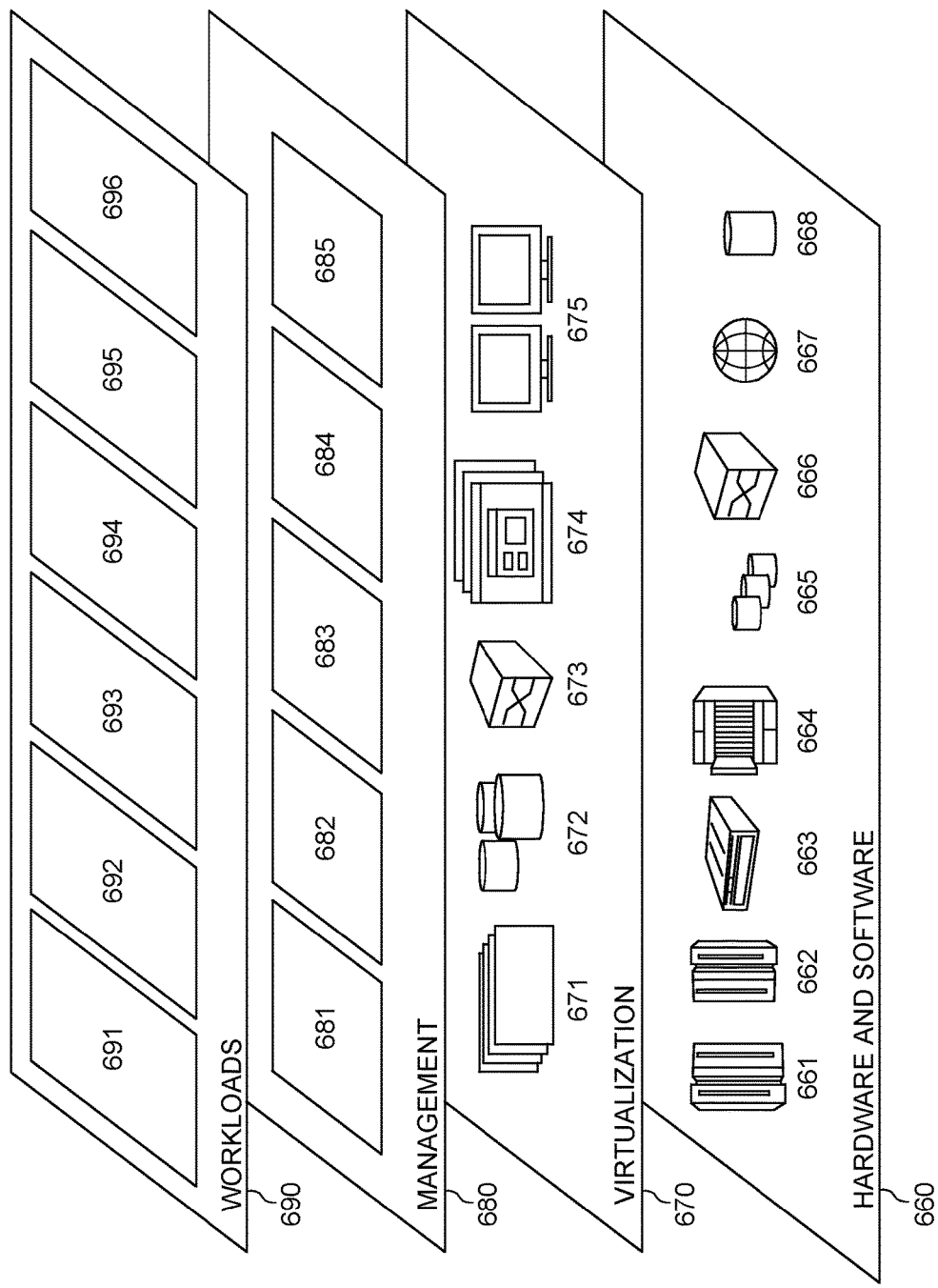
FIG. 6 is a functional block diagram of functional layers of the illustrative cloud computing environment of FIG. 5, in accordance with an embodiment of the present invention.

Referring now to FIG. 6, a set of functional abstraction layers provided by cloud computing environment 500 (as shown in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 114 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and leverage cycle stealing program 696. The leverage cycle stealing program may improve slack timings of an electronic circuit design.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for implementing timing adjustments in an integrated circuit, the computer program product comprising:
   one or more computer-readable storage media and program instructions stored on the one or more computer-readable storage media, the program instructions comprising:
   program instructions to calculate an input timing slack at an input to a latch by program instructions to subtract an input arrival time to the latch from an input required arrival time of the latch;
   program instructions to calculate an output timing slack at an output to the latch by program instructions to subtract an output arrival time of the latch from an output required arrival time from the latch;

program instructions to perform cycle stealing to improve the output timing slack by program instructions to modify the required arrival time of the latch and the required output arrival time;

program instructions to reduce the output timing slack by a pessimism amount;

program instructions to perform optimization by program instructions to make design modifications in the integrated circuit to improve the input timing slack and the output timing slack until a desired slack goal is achieved; and program instructions to increase the output timing slack by the pessimism amount.

2. The computer program product according to claim 1, further comprising:

program instructions perform final power recovery.

3. The computer program product according to claim 1, wherein the latch comprises at least one of the following: an unbalanced input timing slack and output timing slack, the output timing slack above a target threshold, or a cycle boundary occurring earlier than an end of an active clock interval.

4. The computer program product according to claim 1, wherein program instructions to perform optimization comprises at least one of the following:

program instructions to modify a physical size of a logic device in the integrated circuit;

program instructions to change a wire size in the integrated circuit; and program instructions to swap design equivalents.

5. The computer program product according to claim 1, wherein the desired slack goal comprises the output timing slack equal to zero.

6. The computer program product according to claim 1, wherein the desired slack goal comprises the input timing slack equal to the output timing slack.

7. A computer system for implementing timing adjustments in an integrated circuit, the computer system comprising:

one or more computer processors, one or more computer-readable storage media, and program instructions stored on the one or more computer-readable storage media for execution by at least one of the one or more processors, the program instructions comprising:

program instructions to calculate an input timing slack at an input to a latch by program instructions to subtract an input arrival time to the latch from an input required arrival time of the latch;

program instructions to calculate an output timing slack at an output to the latch by program instructions to subtract an output arrival time of the latch from an output required arrival time from the latch;

program instructions to perform cycle stealing to improve the input timing slack by program instructions to modify the input required arrival time of the latch and the output arrival time;

program instructions to reduce the output timing slack by a pessimism amount;

program instructions to perform optimization by program instructions to make design modifications in the integrated circuit to improve the input timing slack and the output timing slack until a desired slack goal is achieved; and program instructions to increase the output timing slack by the pessimism amount.

8. The computer system according to claim 7, further comprising:

program instructions perform final power recovery.

9. The computer system according to claim 7, wherein the latch comprises at least one of the following: an unbalanced input timing slack and output timing slack, the output timing slack above a target threshold, or a cycle boundary occurring earlier than an end of an active clock interval.

10. The computer system according to claim 7, wherein program instructions to perform optimization comprises at least one of the following:

program instructions to modify a physical size of a logic device in the integrated circuit;

program instructions to change a wire size in the integrated circuit; and program instructions to swap design equivalents.

11. The computer system according to claim 7, wherein program instructions to perform final power recovery comprises:

program instructions to remove unnecessary output timing slack improvement; and program instructions to remove unnecessary input timing slack improvement.

12. The computer system according to claim 7, wherein the pessimism amount is based on at least one of the following:

the input timing slack;

program instructions to estimate a maximum possible slack improvement; and program instructions to calculate a difference between a current cycle boundary time and a time which corresponds with an end of an active clock interval.

* * * * *